United States Patent
Calvert

(10) Patent No.: US 8,585,147 B2
(45) Date of Patent: Nov. 19, 2013

(54) STOWABLE REAR SEAT WITH FORE AND AFT ADJUSTMENT

(75) Inventor: Kyle Calvert, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 266 days.

(21) Appl. No.: 13/173,416

(22) Filed: Jun. 30, 2011

(65) Prior Publication Data

US 2013/0001394 A1 Jan. 3, 2013

(51) Int. Cl.
*B60N 2/06* (2006.01)
*B60N 2/12* (2006.01)
*B60N 2/18* (2006.01)

(52) U.S. Cl.
USPC .............. 297/344.13; 297/334; 297/344.15; 297/378.12; 297/378.14

(58) Field of Classification Search
USPC ............. 297/334, 344.13, 378.12, 378.14, 297/344.15
See application file for complete search history.

(56) References Cited

U.S. PATENT DOCUMENTS

| | | | |
|---|---|---|---|
| 4,767,157 A | 8/1988 | Kazaoka et al. | |
| 4,778,138 A | 10/1988 | Yamada | |
| 5,121,895 A * | 6/1992 | Ikegaya et al. | 297/344.13 X |
| 5,979,985 A | 11/1999 | Bauer et al. | |
| 6,347,778 B1 * | 2/2002 | Koga et al. | 297/344.13 X |
| 6,964,452 B2 * | 11/2005 | Kammerer | 297/334 X |
| 7,172,251 B2 * | 2/2007 | Takata et al. | 297/344.13 X |
| 7,300,108 B2 * | 11/2007 | Canteleux | 297/344.15 |
| 7,631,939 B2 | 12/2009 | Wulf et al. | |
| 7,651,166 B2 * | 1/2010 | Schwingenschlogel et al. | 297/378.12 |
| 8,042,867 B2 * | 10/2011 | Meister et al. | 297/334 X |
| 8,096,617 B2 * | 1/2012 | McCulloch et al. | 297/344.15 |
| 8,480,051 B2 * | 7/2013 | Muhlberger et al. | 297/334 X |
| 2008/0048477 A1 | 2/2008 | Ujimoto et al. | |

FOREIGN PATENT DOCUMENTS

| | | |
|---|---|---|
| DE | 102005056570 A1 | 5/2007 |
| DE | 102006004497 A1 | 8/2007 |
| DE | 102006030259 A1 | 1/2008 |
| DE | 102008011987 A1 | 6/2009 |
| JP | 2001001814 A | 1/2001 |

OTHER PUBLICATIONS

German Patent and Trademark Office, Office Action for the corresponding German Patent Application No. 10 2012 209 688.4 mailed Sep. 2, 2013.

* cited by examiner

*Primary Examiner* — Rodney B White
(74) *Attorney, Agent, or Firm* — Brooks Kushman P.C.

(57) ABSTRACT

A vehicle seat is provided with a linkage that may be used to raise and lower a front portion of the seat base. A track assembly is provided in combination with the linkage that moves the seat in a fore-and-aft direction with the seat back in either an upright or fold flat position. The linkage for adjusting the position of the front of the seat base may be actuated by pivoting the seat back between the upright and fold flat position.

13 Claims, 4 Drawing Sheets

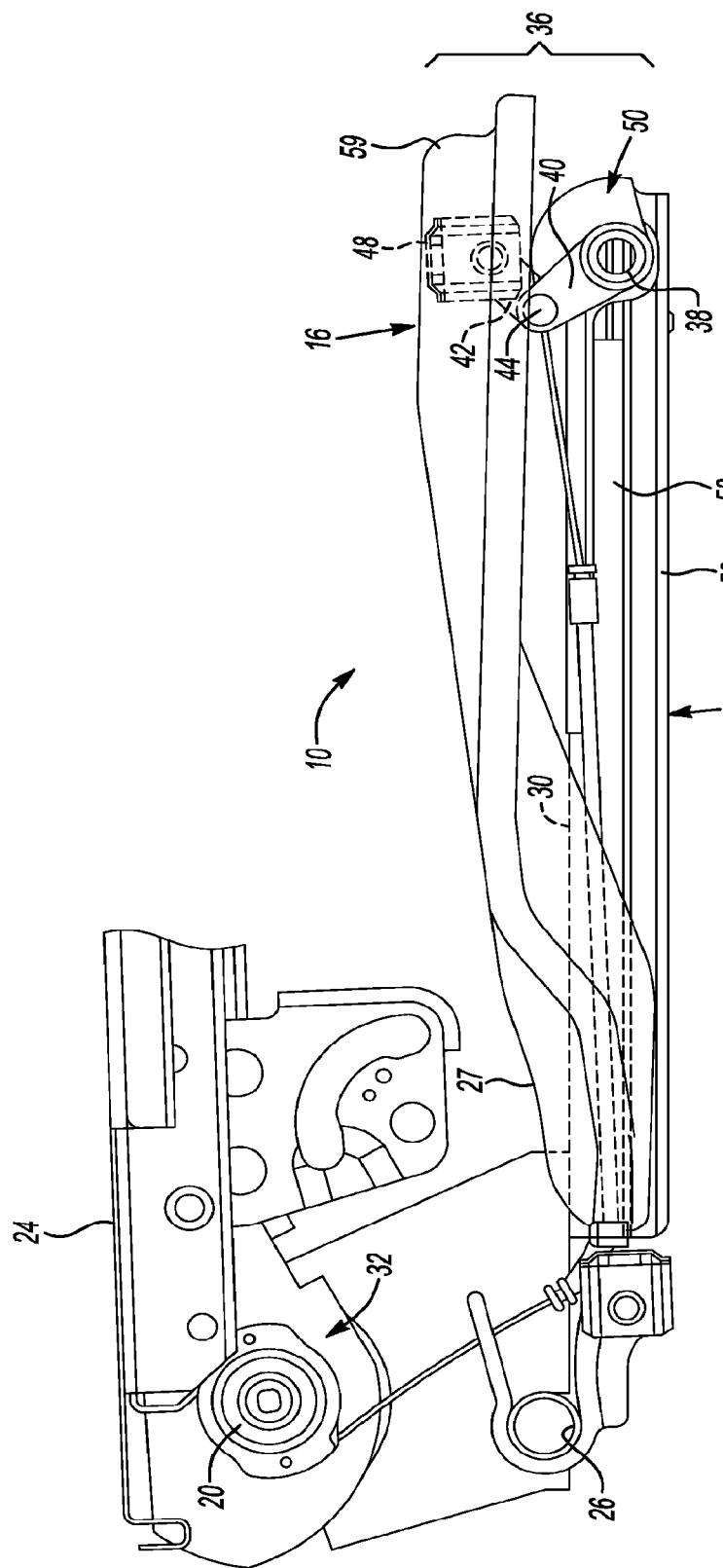

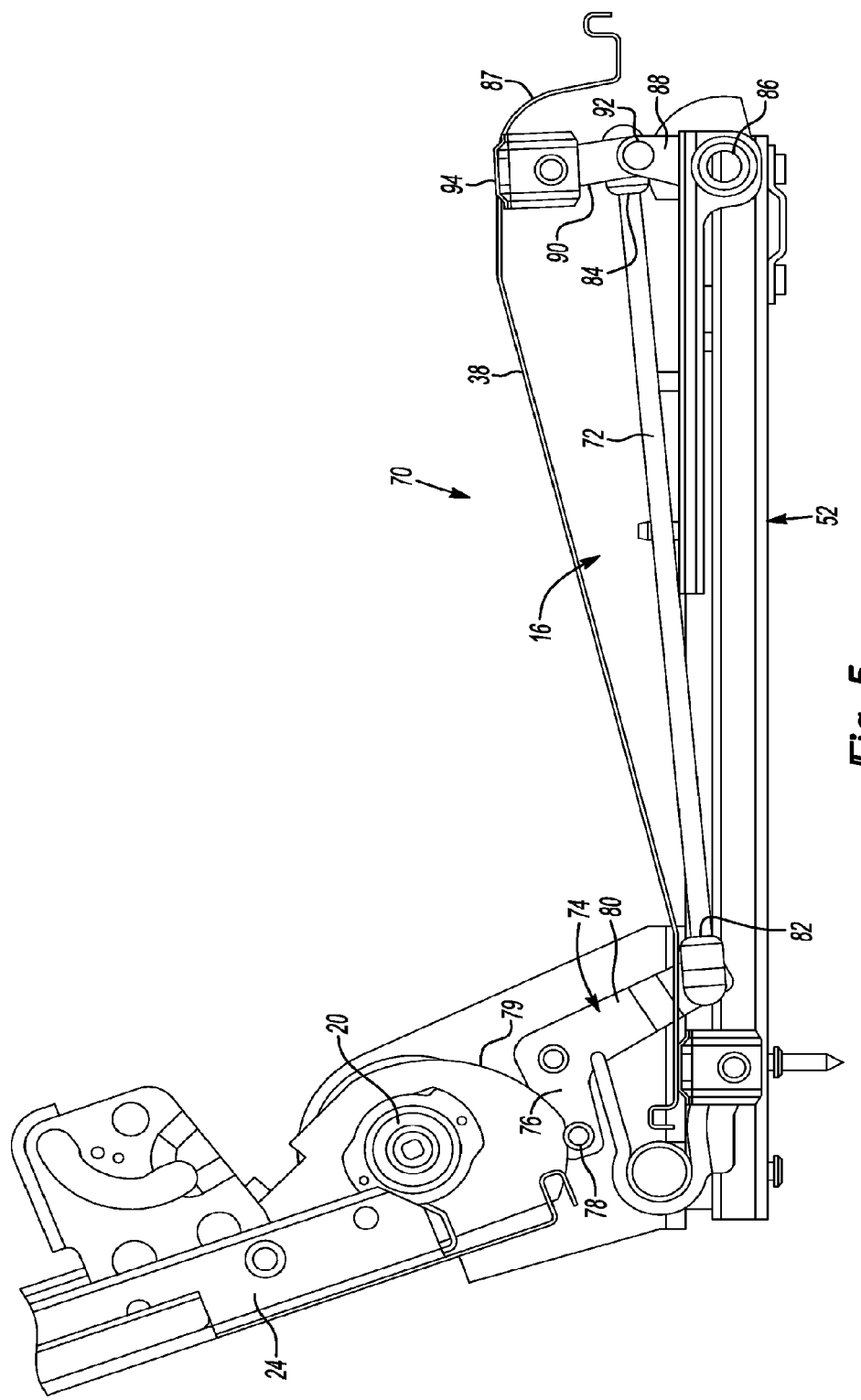

STOWABLE REAR SEAT WITH FORE AND AFT ADJUSTMENT

TECHNICAL FIELD

This development relates to vehicle seat stowing and adjustment mechanisms.

BACKGROUND

Vehicle seats are designed to provide comfortable seating for vehicle occupants. Vehicle seats may be designed to fold or pivot to provide flexibility in the way that a vehicle may be arranged to provide added storage space for hauling cargo. The following patents and published patent applications were reviewed in the course of preparing this application: U.S. Pat. Nos. 4,767,157; 4,778,138; 5,979,985; 7,631,939; and U.S. Published Application 2008/0048477.

SUMMARY

According to one aspect of the present disclosure, a vehicle seat is disclosed for a vehicle that has a seat base having a cushion frame having a front portion that is shifted between a raised position and a lowered position. A seatback is attached to the seat base by a hinge. A linkage is provided between the cushion frame and the floor of the vehicle. The linkage has a front pivot bar, a lower link that is affixed to the front pivot bar to pivot with the front pivot bar, and an upper link that is connected to the lower link by a pivot connector and the cushion frame. The front pivot bar may be pivoted to move the upper and lower links from a lowered position in which the upper and lower links are arranged at an angle with the pivot connector rearward of the front pivot bar to a raised position in which the upper and lower links are arranged in an over-center orientation with the pivot connector above and forward relative to the front pivot bar. A rear portion of the cushion frame is pivotally connected to a rear pivot bar. An actuator operatively connects the front pivot bar, lower link and upper link to move the front portion of the cushion frame between the raised position and the lowered position.

According to another aspect of the disclosure, a vehicle seat is provided for a vehicle. The seat includes a seat base having a cushion frame that shifts between a raised position and a lowered position and that also includes a seatback attached to the seat base by a hinge. A linkage including articulated links is provided between the cushion frame and the floor of the vehicle. The articulated links pivot the cushion frame between a raised position in which a front portion of the cushion frame is higher than a rear portion of the cushion frame and a lowered position in which the front portion of the cushion frame is lowered to substantially the same height as the rear portion of the cushion frame. A rear portion of the cushion frame is pivotally connected to a rear pivot bar. An actuator is operatively connected to the front pivot bar, lower link and upper link to move the cushion frame between the raised position and the lowered position. A slide track assembly connects the cushion frame and linkage to the floor, so that the linkage is movable in the fore and aft directions.

According to another aspect of the disclosure, a vehicle seat is provided that automatically lowers the front portion of the vehicle seat when the seatback is moved to a fold flat position. The seat includes a seat base having a cushion frame that is shifted between a raised position and a lowered position. A seatback is attached to the seat base by a hinge. The seatback may be selectively pivoted to a fold flat orientation with the seatback being pivoted to a position in which the seatback overlies the seat base. A linkage is provided between the cushion frame and the floor that has articulated links that pivot the cushion frame between the raised position in which a front portion of the cushion frame is higher than a rear portion of the cushion frame and a lowered position in which the front portion of the cushion frame is lowered to substantially the same height as the rear portion of the cushion frame. A rear portion of the cushion frame is pivotally connected to a rear pivot bar. An actuator is operatively connected to the linkage to move the cushion frame between the raised position and the lowered position. The actuator is operatively connected to the seatback so that by pivoting the seatback to the fold flat position, the linkage moves the cushion frame between the raised position and the lowered position.

According to further aspects of this disclosure that may be applicable to any of the embodiments summarized above, the actuator may further comprise a control cable that is connected to a lever that is affixed to the front pivot link to pivot the front pivot bar. Alternatively, the actuator may comprise a rigid link that is connected to a lever that is affixed to the front pivot bar to pivot the front pivot bar. The actuator further comprises a cam and a bell crank that are connected to the rigid link and a lever that is affixed to the front pivot rod to pivot the front pivot bar. A slide track assembly may be provided that connects the cushion frame and linkage to the floor for moving the seat fore and aft.

According other aspects of the disclosure, a seatback recliner mechanism is disclosed that is selectively adjusted to change the angular orientation of the seatback relative to the seat base. The seatback may be selectively pivoted to a fold flat orientation with the seatback pivoted to a position in which the seatback overlies the seat base. As the seatback is pivoted to the fold flat position the actuator may be actuated to move the cushion frame between the raised position and the lowered position by the recliner. The seatback may be selectively pivoted to a fold flat orientation with the seatback being pivoted from a seating position in which the seatback is in a substantially vertical reclined position to a stowed position in which the seatback overlies the seat base. The seat may also include a slide track assembly that connects the cushion frame and linkage to the floor to be movable fore and aft with the seatback in either the seating position or the stowed position.

These and other aspects of the disclosure will be more fully explained with reference to the attached drawings and the following detailed description.

BRIEF DESCRIPTION OF THE DRAWINGS

FIG. 4 is a fragmentary inside elevation view of the control cable, linkage and slide track assembly for the stowable rear seat with a front portion height adjustment linkage shown in FIG. 1 in a lowered position; and FIG. 5 is a fragmentary inside elevation view of an alternative embodiment of a push rod linkage and track assembly for a stowable rear seat with a front portion height adjustment linkage.

DETAILED DESCRIPTION

A detailed description of the illustrated embodiments of the present invention are provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
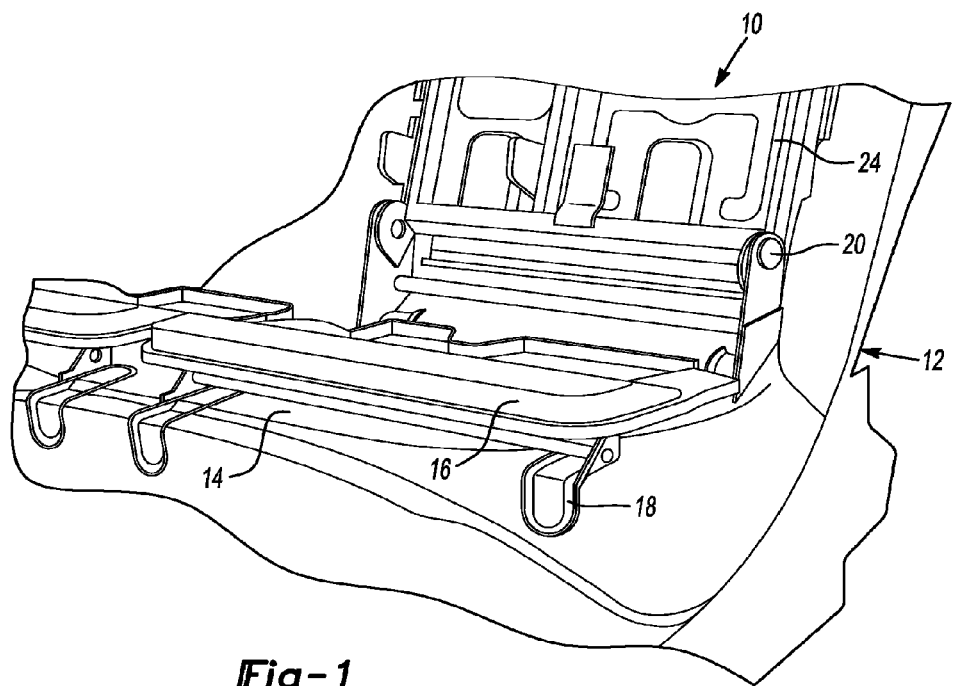
FIG. 1 is a fragmentary front perspective view of a stowable rear seat with a mechanism for adjusting the height of the front portion of the vehicle seat.

Referring to FIG. 1, a rear seat generally indicated by reference numeral 10 is illustrated as it is installed in a vehicle generally indicated by reference numeral 12. The rear seat 10 is secured to the floor 14 of the vehicle 12. A seat base cushion frame 16 is secured by front brackets 18 to the floor 14. Recliners 20, or hinges, are used to secure a seatback frame 24 to the seat base cushion frame 16. As is well known in the art, foam buns and seat covers are installed on the cushion frame 16 and seatback frame 24, but are not shown in the illustrated embodiment because they would obscure the other component parts of the adjustment mechanism.

Figure 2:
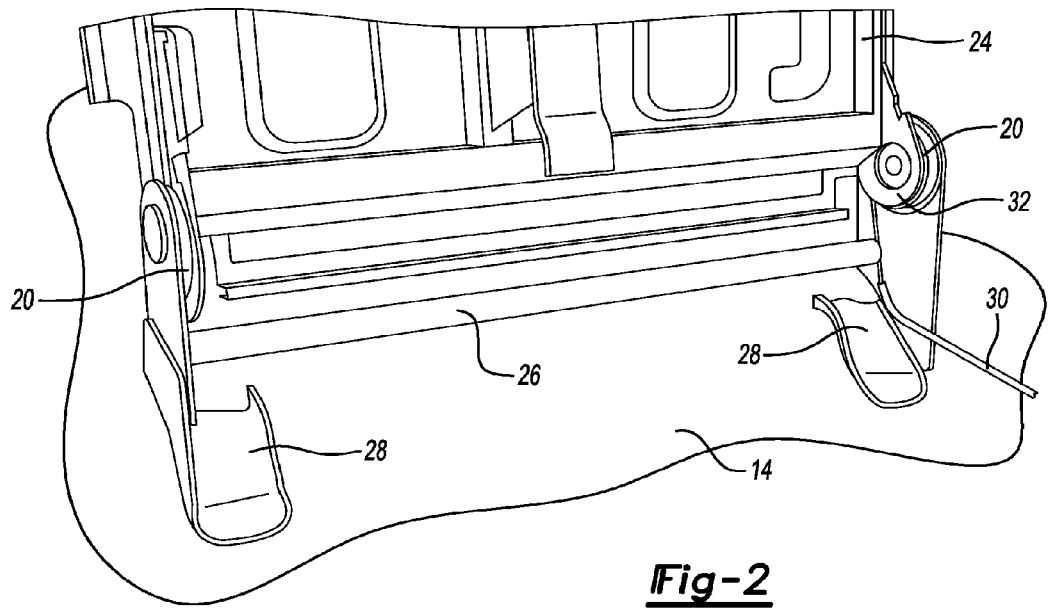
FIG. 2 is a fragmentary perspective view of the rear floor brackets, rear pivot bar and recliner mechanisms provided on the stowable rear seat shown in FIG. 1.
Figure 3:
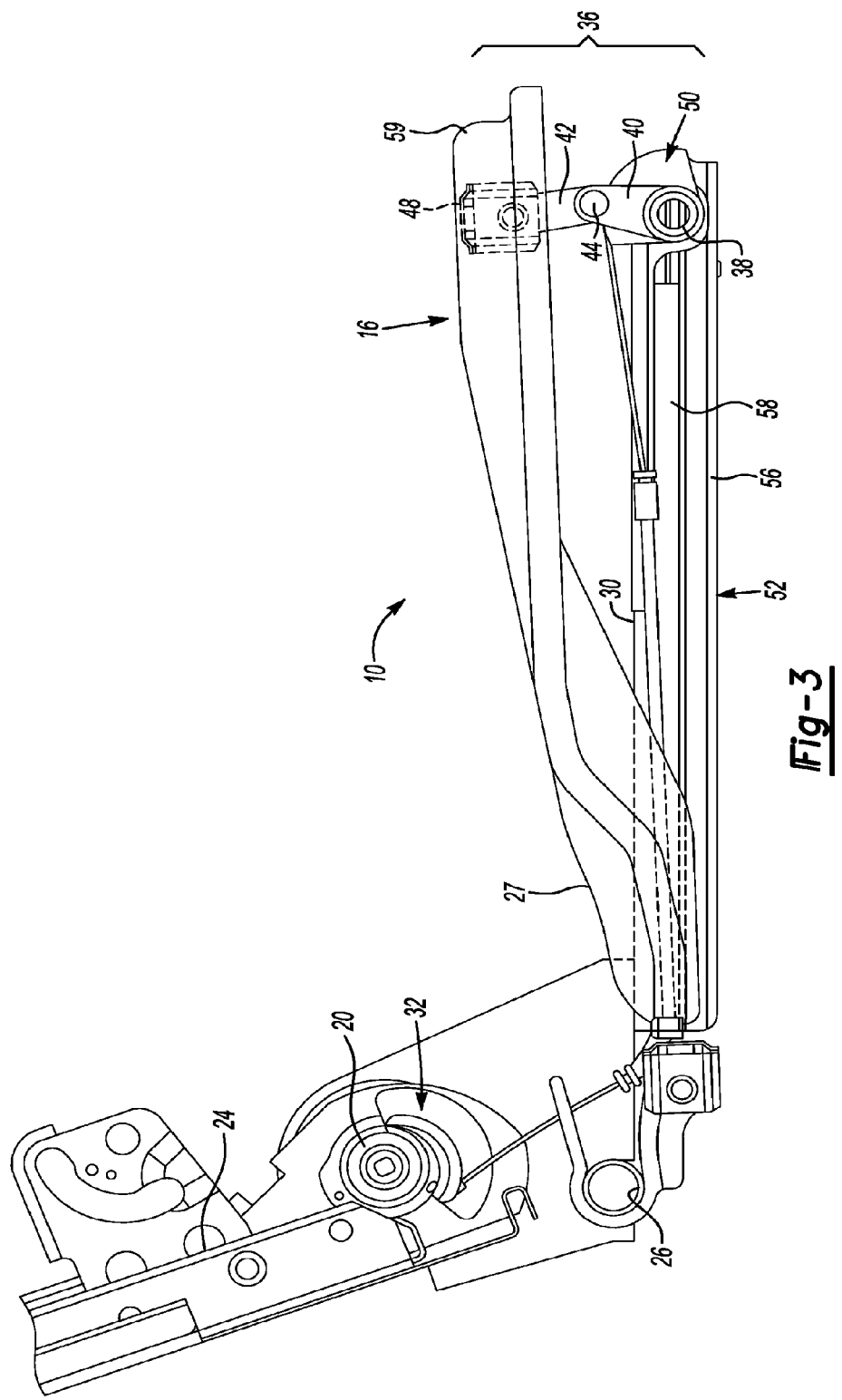
FIG. 3 is a fragmentary inside elevation view of the control cable, linkage and slide track assembly for the stowable rear seat with a front portion height adjustment linkage shown in FIG. 1 in a raised position.

Referring to FIGS. 2 and 3, a rear pivot bar 26 is located in a rear portion 27 of the seat base cushion frame 16 and is below the seatback frame 24. The rear pivot bar 26 is assembled to the floor 14 by a pair of rear brackets 28. A control cable 30 is entrained about a rear cam pulley 32 that is concentrically mounted relative to one of the recliners 20. Operation of the seat adjustment mechanism with the control cable 30 will be better described with reference to FIG. 3.

Referring to FIGS. 3 and 4, a front seat adjustment mechanism and fore-and-aft track are illustrated. One of the recliners 20 is shown attached to the seatback frame 24. The seat base cushion frame 16 is pivotally mounted to the rear pivot bar 26. A base or brackets may be provided to secure the seat 10 to the floor 12 of the vehicle 14, either directly or through a seat adjustment track. The control cable 30 is secured to a rear cam pulley 32. A linkage generally indicated by reference numeral 36 is secured to a front pivot bar 38. The linkage 36 includes the front pivot bar 38, a lower link 40 and an upper link 42 that are connected by a pivot connector 44, or pin. The upper link 42 is secured to the cushion frame 16 by an upper link bracket 48. A front cam pulley 50 is attached to the front pivot bar 38 and is operative to pivot the front pivot bar 38.

A fore-and-aft track assembly generally indicated by reference numeral 52 supports the seat 10 for movement in the fore-and-aft vehicle direction. Adjustment in the fore-and-aft direction provides additional comfort for vehicle occupants and also facilitates moving the vehicle seat in either an upright or the fold flat position to maximize cargo capacity in the vehicle. The fore-and-aft track assembly 52 includes a track base 56 and a sliding track 58. Alternatively, the track assembly may be omitted and the seat may be attached directly to the floor 14, as shown in FIG. 1.

In operation, the seat base cushion frame 16 has a front portion 59 that is located over the front pivot bar 38. The front portion 59 of the cushion frame 16 is movable in the vertical direction. Normally, vehicle seats are oriented with at least 12° rearward inclination for comfort and to reduce the tendency of an occupant to submarine in the event of a sudden deceleration of the vehicle. Additional space can be provided by permitting the front portion 59 of the seat 10 to be lowered when the seatback frame 24 is folded over the seat base cushion frame 16. In addition, additional space may be provided in a desired location by providing a seat 10 that is movable in the fore-and-aft direction on a fore-and-aft track assembly 52.

Adjustment of the height of the front portion 59 of the seat cushion frame 16 is accomplished by pivoting the seatback frame 24 forwardly toward the fold flat position. Folding the seatback frame 24 in the forward direction causes the control cable 30 to be pulled about the rear cam pulley 32. When the control cable 30 is pulled, the front cam pulley 50 rotates the front pivot bar 38 in a counter-clockwise direction, as shown in FIG. 4. Rotation of the front pivot 38 causes the lower link 40 and upper link 42 to move from the over-center position shown in FIG. 3 rearwardly with the lower link 40 and upper link 42 being connected by pin 44 to the lowered position shown in FIG. 4.

Referring to FIG. 5, an alternative embodiment is shown that features a push rod seat adjuster generally indicated by reference numeral 70. Components of this embodiment that are substantially the same as the previously described embodiments may be referenced with the same reference numerals. A push rod 72, or rigid link, is secured to a bell crank 74 that is disposed adjacent to one of the recliners 20 that supports the seatback frame 24 in an upright orientation relative to the seat base cushion frame 38. The bell crank 74 includes a first leg 76 that has a cam pin 78 that follows a cam surface 79 provided on the seatback frame 24. A second leg 80 of the bell crank 74 is secured to a first end 82 of the push rod 72. A second end 84 of the push rod 72 is operatively connected to the front pivot bar 86 to rotate the front pivot bar 86 to raise and lower the front portion 87 of the seat base cushion frame 16. A lower link 88 is connected to the front pivot bar 86 and an upper link 90 is connected to the lower link 88 by a pivot connector 92, or pin. An upper link bracket 94 connects the upper link 90 to the seat base cushion frame 16. The second end 84 of the push rod 72 may be connected to the pin 92, or alternatively, the second end of the push rod 72 may be connected to the front pivot bar 86 by a separate lever (not shown). The push rod 72 is used to pivot the front pivot bar 86 between a raised and lowered position.

Operation of the push rod seat adjuster 70 is described with reference to FIG. 5. When the seatback frame 24 is rotated in the forward direction toward the fold flat position in which the seatback frame 24 overlies the seat base cushion frame 16, the first leg 76 of the bell crank 74 rotates upwardly causing the bell crank 74 to rotate in the clockwise direction. The second leg 80 of the bell crank 74 pulls the rigid link 72, or push rod, rearwardly. The push rod 72 rotates the front pivot bar 86 in a counter-clockwise direction, as shown in FIG. 4. This motion causes the lower link 88 and upper link 90 to pivot about the pivot connector 92, which in turn causes the upper link bracket 94 to move with the seat base cushion frame 38 downwardly into its lowered position.

A fore-and-aft track assembly 52 is also shown in FIG. 5 that operates in the same manner as the track assembly 52 described with reference to FIGS. 3 and 4. The track assembly 52 may be omitted and the seat may be assembled with the adjustment mechanism directly to the floor 14 as shown in FIG. 1. The description of the operation of the fore-and-aft track assembly 52 will not be repeated for brevity.

The examples described above are not intended to describe all possible forms of the invention. The words used in the specification are words of description rather than limitation. It should be understood that various changes may be made without departing from the spirit and scope of the invention. The features of various embodiments may be combined to form further embodiments of the invention.

What is claimed is:

1. A vehicle seat for a vehicle having a floor, the seat comprising:
    a seat base having a cushion frame with a front portion that is shifted between a raised position and a lowered position;
    a seatback attached to the seat base by a hinge;
    a linkage is provided between the cushion frame and the floor, the linkage includes a front pivot bar, a lower link affixed to the front pivot bar to pivot with the front pivot bar, an upper link is connected to the lower link by a pivot connector and is connected to the cushion frame, wherein the front pivot bar may be pivoted to move the upper and lower links from a lowered position in which the upper and lower links are arranged at an angle with the pivot connector rearward of the front pivot bar to a raised position in which the upper and lower links are arranged in an over-center orientation with the pivot connector above and forward of the front pivot bar;
    a rear portion of the cushion frame is pivotally connected to a rear pivot bar; and
    an actuator is operatively connected to the front pivot bar, lower link and upper link to move the front portion of the cushion frame between the raised position and the lowered position, and wherein the actuator further comprises a control cable that is operatively connected to the front pivot bar to pivot the front pivot bar.

2. A vehicle seat for a vehicle having a floor, the seat comprising:
    a seat base having a cushion frame with a front portion that is shifted between a raised position and a lowered position;
    a seatback attached to the seat base by a hinge;
    a linkage is provided between the cushion frame and the floor, the linkage includes a front pivot bar, a lower link affixed to the front pivot bar to pivot with the front pivot bar, an upper link is connected to the lower link by a pivot connector and is connected to the cushion frame, wherein the front pivot bar may be pivoted to move the upper and lower links from a lowered position in which the upper and lower links are arranged at an angle with the pivot connector rearward of the front pivot bar to a raised position in which the upper and lower links are arranged in an over-center orientation with the pivot connector above and forward of the front pivot bar;
    a rear portion of the cushion frame is pivotally connected to a rear pivot bar; and
    an actuator is operatively connected to the front pivot bar, lower link and upper link to move the front portion of the cushion frame between the raised position and the lowered position, and a cam and a bell crank that are attached to and act upon a rigid link that is operatively connected to the front pivot bar to pivot the front pivot bar.

3. The seat of claim 1 further comprising a slide track assembly that connects the cushion frame and linkage to the floor, wherein the linkage is movable fore-and-aft.

4. A vehicle seat for a vehicle having a floor, the seat comprising:
    a seat base having a cushion frame with a front portion that is shifted between a raised position and a lowered position;
    a seatback attached to the seat base by a hinge, wherein the hinge is a seatback recliner mechanism that is selectively adjusted to change the angular orientation of the seatback relative to the seat base, and wherein the seatback may be selectively pivoted to a fold flat orientation wherein the seatback is pivoted to a position in which the seatback overlies the seat base;
    a linkage is provided between the cushion frame and the floor, the linkage includes a front pivot bar, a lower link affixed to the front pivot bar to pivot with the front pivot bar, an upper link is connected to the lower link by a pivot connector and is connected to the cushion frame, wherein the front pivot bar may be pivoted to move the upper and lower links from a lowered position in which the upper and lower links are arranged at an angle with the pivot connector rearward of the front pivot bar to a raised position in which the upper and lower links are arranged in an over-center orientation with the pivot connector above and forward of the front pivot bar;
    a rear portion of the cushion frame is pivotally connected to a rear pivot bar; and
    an actuator is operatively connected to the front pivot bar, lower link and upper link to move the front portion of the cushion frame between the raised position and the lowered position, wherein as the seatback is pivoted to the fold flat position the actuator moves the cushion frame between the raised position and the lowered position by the recliner.

5. The seat of claim 1 wherein the seatback may be selectively pivoted to a fold flat orientation wherein the seatback is pivoted from a seating position in which the seatback is in a substantially vertical reclined position to a stowed position in which the seatback overlies the seat base, the seat further comprising a slide track assembly that connects the cushion frame and linkage to the floor, wherein the linkage is movable fore and aft with the seatback in either the seating position or the stowed position.

6. A vehicle seat for a vehicle having a floor, the seat comprising:
    a seat base having a cushion frame that is shifted between a raised position and a lowered position;
    a seatback attached to the seat base by a hinge;
    a linkage provided between the cushion frame and the floor, the linkage includes articulated links that pivot the cushion frame between the raised position in which a front portion of the cushion frame is higher than a rear portion of the cushion frame and the lowered position in which the front portion of the cushion frame is lowered to substantially the same height as the rear portion of the cushion frame;
    a rear portion of the cushion frame is pivotally connected to a rear pivot bar;
    an actuator is operatively connected to the linkage to move the cushion frame between the raised position and the lowered position, and wherein the actuator further comprises a control cable that is operatively connected to the front pivot bar to pivot the front pivot bar; and
    a slide track assembly connects the cushion frame and linkage to the floor to be movable fore-and-aft.

7. A vehicle seat for a vehicle having a floor, the seat comprising:
    a seat base having a cushion frame that is shifted between a raised position and a lowered position;
    a seatback attached to the seat base by a hinge;
    a linkage provided between the cushion frame and the floor, the linkage includes articulated links that pivot the cushion frame between the raised position in which a front portion of the cushion frame is higher than a rear portion of the cushion frame and the lowered position in which the front portion of the cushion frame is lowered to substantially the same height as the rear portion of the cushion frame;

a rear portion of the cushion frame is pivotally connected to a rear pivot bar;

an actuator is operatively connected to the linkage to move the cushion frame between the raised position and the lowered position, wherein the actuator further comprises a cam and a bell crank that are attached to and act upon a rigid link that is operatively connected to the front pivot bar to pivot the front pivot bar; and a slide track assembly connects the cushion frame and linkage to the floor to be movably fore-and-aft.

8. The seat of claim 6 wherein the hinge is a seatback recliner mechanism that is selectively adjusted to change the angular orientation of the seatback relative to the seat base.

9. The seat of claim 8 wherein the seatback may be selectively pivoted to a fold flat orientation with the seatback being pivoted to a position in which the seatback overlies the seat base.

10. The seat of claim 9 wherein as the seatback is pivoted to the fold flat position, the actuator moves the cushion frame between the raised position and the lowered position by the recliner.

11. The seat of claim 6 wherein the seatback may be selectively pivoted to a fold flat orientation wherein the seatback is pivoted from a seating position in which the seatback is in a substantially vertical reclined position to a stowed position in which the seatback overlies the seat base, the seat further comprising a slide track assembly that connects the cushion frame and linkage to the floor, wherein the linkage is movable fore and aft with the seatback in either the seating position or the stowed position.

12. A vehicle seat for a vehicle having a floor, the seat comprising:

a seat base having a cushion frame that is shifted between a first position and a second position;

a seatback attached to the seat base by a hinge, wherein the seatback may be selectively pivoted to a fold flat orientation with the seatback being pivoted to a position in which the seatback overlies the seat base;

a linkage is provided between the cushion frame and the floor, the linkage includes articulated links that pivot the cushion frame between the first position in which a front portion of the cushion frame is higher than a rear portion of the cushion frame and a second position in which the front portion of the cushion frame is lowered to substantially the same height as the rear portion of the cushion frame; and a rear portion of the cushion frame is pivotally connected to a rear pivot bar;

an actuator is operatively connected to the linkage to move the cushion frame between the first position and the second position, wherein the actuator is operatively connected to the seatback, and wherein pivoting the seatback to the fold flat position actuates the linkage to move the cushion frame between the first position and the second position; and a control cable that is entrained about a rear cam pulley that is operatively attached to the seatback and a front cam pulley that is provided on a front pivot bar of the linkage, wherein folding the seatback to the fold flat position pulls the control cable around the rear cam pulley to rotate the front cam pulley and the front pivot bar.

13. A vehicle seat for a vehicle having a floor, the seat comprising:

a seat base having a cushion frame that is shifted between a first position and a second position;

a seatback attached to the eat base by a hinge, wherein the seatback may be selectively pivoted to a fold flat orientation with the seatback being pivoted to a position in which the seatback overlies the seat base;

a linkage is provided between the cushion frame and the floor, the linkage includes articulated links that pivot the cushion frame between the first position in which a front portion of the cushion frame is higher than a rear portion of the cushion frame and a second position in which the front portion of the cushion frame is lowered to substantially the same height as the rear portion of the cushion frame; and a rear portion of the cushion frame is pivotally connected to a rear pivot bar;

an actuator is operatively connected to the linkage to move the cushion frame between the first position and the second position, wherein the actuator is operatively connected to the seatback, and wherein pivoting the seatback to the fold flat position actuates the linkage to move the cushion frame between the first position and the second position; and a bell crank pivotally attached to the seat base and having a first leg attached to the seatback and a second leg attached to a first end of a rigid link, wherein a second end the rigid link is attached to a lever provided on a front pivot bar of the linkage, and wherein folding the seatback to the fold flat position rotates the bell crank, pulls the rigid link and rotates the lever and front pivot bar.

\* \* \* \* \*

UNITED STATES PATENT AND TRADEMARK OFFICE
CERTIFICATE OF CORRECTION

| | | |
|---|---|---|
| PATENT NO. | : 8,585,147 B2 | Page 1 of 1 |
| APPLICATION NO. | : 13/173416 | |
| DATED | : November 19, 2013 | |
| INVENTOR(S) | : Kyle Calvert et al. | |

It is certified that error appears in the above-identified patent and that said Letters Patent is hereby corrected as shown below:

In the Claims

Column 8, Line 18, Claim 13:

After "a seatback attached to the"
Delete "eat" and
Insert -- seat --.

Signed and Sealed this
Thirteenth Day of May, 2014

Michelle K. Lee
*Deputy Director of the United States Patent and Trademark Office*